(No Model.)
G. A. SCHOENIKE.
UMBRELLA HOLDER.
No. 416,755. Patented Dec. 10, 1889.
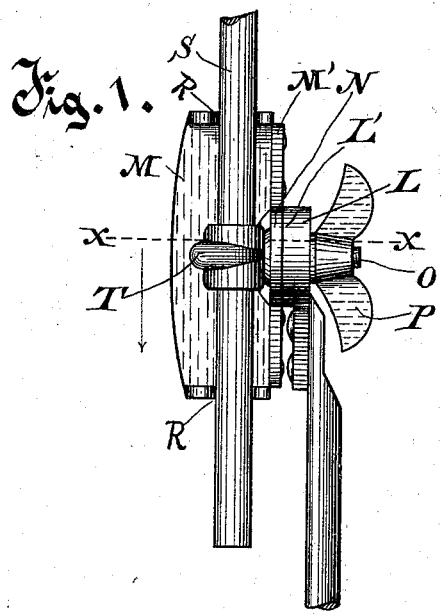
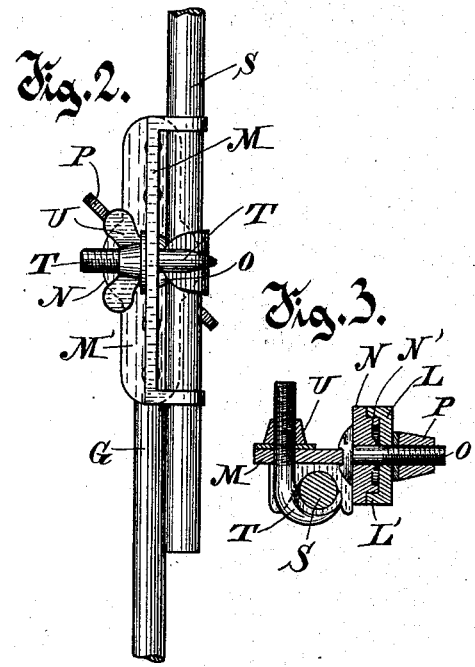
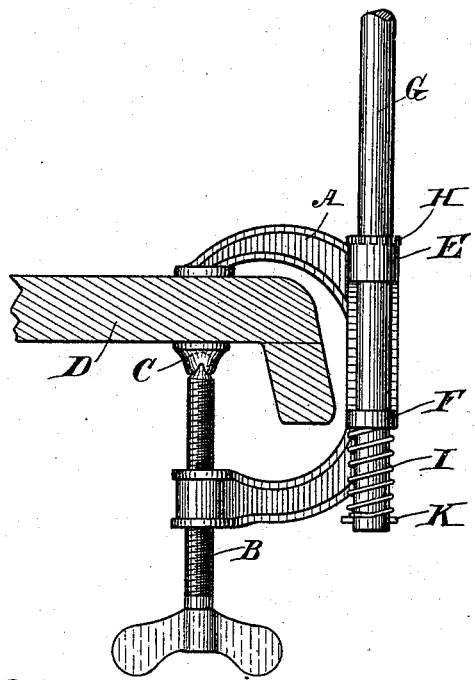
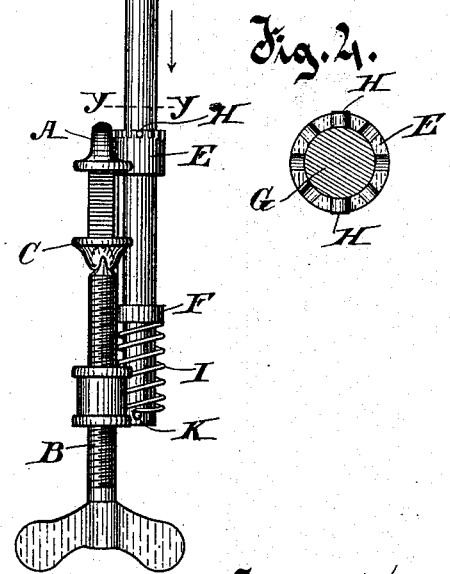
Witnesses:
O. H. Keney,
Anna Faust
Inventor:
Gustav A. Schoenike
By Ermin & Benedict
Attorneys.

UNITED STATES PATENT OFFICE.

GUSTAV A. SCHOENIKE, OF OSHKOSH, WISCONSIN.

UMBRELLA-HOLDER.

SPECIFICATION forming part of Letters Patent No. 416,755, dated December 10, 1889.

Application filed February 4, 1889. Serial No. 298,644. (No model.)

*To all whom it may concern:*

Be it known that I, GUSTAV A. SCHOENIKE, of Oshkosh, in the county of Winnebago and State of Wisconsin, have invented new and useful Improvements in Umbrella-Holders; and I do hereby declare the following to be a full, clear, and exact description of said invention, reference being had to the accompanying drawings, and to the letters of reference marked thereon, which form a part of this specification.

The object of my invention is to provide a device for securely holding an umbrella on a wagon-seat or other fixed support, and for various adjustments of position of the umbrella with reference to the fixed support, as desired.

In the drawings, Figure 1 is an elevation with my improved device as used in connection with a vehicle-seat. Fig. 2 is a view of the same device, taken at right angles to the view shown in Fig. 1. Fig. 3 is a transverse section on line X X of Fig. 1, looking in the direction of the arrow. Fig. 4 is a transverse section taken on line Y Y of Fig. 2, looking in the direction of the arrow.

A clamp A, provided with a thumb-screw B, turning through one arm of the clamp and provided with a head C, secured thereto by a universal joint, the face of which head C is opposite to the face of the free end of the other arm of the clamp, is adapted to clutch and be thereby secured rigidly to a vehicle-seat D or other fixed support in connection with a vehicle.

To the body of the clamp A are affixed rigidly two collars or brackets E and F at a distance apart, through which passes a rod G, which rod is supported and has endwise movement in the brackets E and F. The upper edge of the bracket E is provided with a series of recesses, in which a pin H, fixed in the rod G, is adapted to enter, whereby the rod G is supported in the brackets, and by raising and turning the rod around and allowing the pin H to enter any desired recess in the top of the bracket E the rod may be rotated and adjusted radially in any desired position.

Below the bracket F a spiral spring I is coiled around the rod G and bears at its upper end against the bracket F and at its lower end against a pin K, thrust through the rod G, by the recoil of which spring the pin H in rod G is held yieldingly in position in recesses in the bracket E. The rod G at its other extremity is provided with a circular disk L, affixed rigidly thereto, and a movable bracket M is provided with a corresponding disk N, bearing against and adapted to rotate upon the disk L, to which it is secured adjustably by means of the bolt O, fixed rigidly centrally in the disk N and passing centrally and movably through the disk L and being provided with a thumb-nut P, whereby the disk N may be clamped rigidly to the disk L in such position as desired. The disk L is preferably provided with a circular flange L' and the disk N with a circular flange N', which flanges are respectively adapted to bear against the face of the opposing disks L and N and to serve as guides, bearing against each other therefor, for the disks in their rotary movements. The body of the bracket M is a plate the respective ends of which are turned inwardly and hollowed out, forming bearings R R for receiving therein and holding the handle S of the umbrella. A clamping-bolt T, provided with a flattened and curved head, passes through an aperture therefor at or near the middle of the bracket M, and is provided with a thumb-nut U, turning thereon and bearing against the outside of the bracket M, the head of which bolt is adapted to pass around the umbrella-handle, and, being drawn firmly down against the handle by means of the nut U thereon, is adapted to clamp the umbrella-handle firmly to the bracket M. The bracket M is provided with a flange M' at right angles to the body of the bracket.

It will be understood that by the rotary movement of the rod G in the brackets E and F the bracket M may be adjusted either to front or rear or at either side of the rod G, as desired, with reference to its position in respect to the fixed support D, and that by means of the vertically-rotating movement of the bracket M on the disk L the umbrella may be tilted to any angle with respect to the rod G that is desired. It will also be understood that the handle S may be adjusted up or down endwise in the bracket M as desired, so that by means of these various provisions for adjustment the umbrella may be located in any possible position with reference to the fixed support D.

What I claim as new, and desire to secure by Letters Patent, is—

1. In an umbrella-holder, a bracket M, having its two ends turned inwardly and provided with recesses for the reception of the handle of the umbrella therein, a bolt T, passing movably through the bracket in an aperture therefor and provided with a nut turning thereon against the outer opposite surface of the bracket, and a flange M' at right angles to the body of the bracket M, the flange M' being provided with a disk N, having a circular flange N', in combination with a disk L, having a circular flange L', the disk being fixed on a supporting-rod, and a bolt O, whereby the disk N is secured adjustably to the disk L, substantially as described.

2. In an umbrella-holder, a supporting-rod supported movably in brackets affixed to a clamp, which rod is provided with a pin adapted to enter recesses therefor in the supporting-bracket, by which lateral rotary adjustment is provided for, and a retaining-spring about the rod for holding it yieldingly in position, and a disk on the upper extremity of the rod, in combination with a bracket held adjustably to the disk on the rod by a bolt and thumb-nut, which bracket has means, substantially as described, for retaining an umbrella-handle adjustably therein, substantially as described.

3. An umbrella-holder consisting of a clamp A, with its thumb-screw B, provided with head C, brackets E and F, and rod G, supported movably and adjustably in the brackets E and F, in combination with a bracket M, having its ends turned inwardly and provided with recesses for the reception of the umbrella-handle therein, and with a clamping-bolt T, which bracket is held adjustably by a disk N to a disk L on the upper extremity of the rod G by a bolt and nut, substantially as described.

In testimony whereof I affix my signature in presence of two witnesses.

GUSTAV A. SCHOENIKE.

Witnesses:
JOHN E. WITZEL,
GEORGE HILTON.